(No Model.)

H. K. JONES.
MANUFACTURE OF SCREW NAILS.

No. 335,131. Patented Feb. 2, 1886.

Witnesses.
John Edwards Jr.
C W Welles

Inventor.
Horace K. Jones.
By James Shepard Atty.

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

MANUFACTURE OF SCREW-NAILS.

SPECIFICATION forming part of Letters Patent No. 335,131, dated February 2, 1886.

Application filed August 4, 1885. Serial No. 173,497. (No model.)

*To all whom it may concern:*

Be it known that I, HORACE K. JONES, a citizen of the United States, residing at Hartford, in the county of Hartford and State of Connecticut, have invented certain new and useful Improvements in the Manufacture of Screw-Nails, of which the following is a specification.

My invention relates to the manufacture of screw-nails from a rod or wire of metal; and the chief objects of my invention are to so perform the successive steps in the manufacture that the screw-nails can be cheaply made by machinery, and so that the nails thus produced will have solid heads.

Figure 1:
Figure 2:
Figure 3:
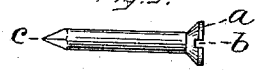
Figure 4:

In the accompanying drawings, Figure 1 shows in side elevation and end view a rod or wire in the shape into which it is formed by the first step in my process. Fig. 2 shows the same in side elevation and end view in the shape into which it is formed by the second step in my process. Fig. 3 shows in side elevation a part of said rod or wire in the shape into which it is formed by the third step in my process; and Fig. 4 is a side elevation of a finished screw-nail, which is a part of said rod or wire in the shape into which it is formed by the fourth step in my process.

I take a rod of metal or wire and feed it to any ordinary heading mechanism for forming the head *a* by upsetting, thereby changing said stock at one end from a rod or wire into the form shown in Fig. 1. I next form the slot *b* in said head, thereby changing the stock from the form shown in Fig. 1 to that shown in Fig. 2. This slotting I prefer to do while the rod is still within the grasp of the heading-dies, and thereby save handling or moving the stock.

While I do not confine myself to any particular means for forming this slot, I will mention one mechanism for and mode of so doing. A small saw may be arranged in the machine so as to travel across the head, just after the header retreats, and the heading-die may be slotted on two sides to permit said saw to pass through it. After slotting the head, I cut off a proper length of the headed wire for a screw-nail and form the point *c* thereon, thereby changing the stock from the form shown in Fig. 2 to that shown in Fig. 3. I prefer to cut off and point the wire at one operation by means of combined shearing or cutting and swaging dies, thereby producing what is known as the "cut point" of wire nails. The screw-thread or barb *d* is next formed, thereby changing the stock from the form shown in Fig. 3 to that shown in Fig. 4. The thread or barb *d* may be formed by cutting, swaging, or in other ordinary manner.

By slotting the head before the nail or blank is severed from the main rod I save the operation of placing the nails in a special slotting-machine, as is the practice in the ordinary mode of making screws or screw-nails, the heads being slotted after the screws or nails are cut from the rod or wire.

By heading a plain rod and finally threading I produce heads which are solid throughout, whereas heads formed on a portion of a rod or wire previously threaded or barbed are filled with seams.

The advantage of slotting the head before cutting the screw-nail from the stock may be gained and complete screw-nails be produced by performing the first three steps of my process upon wire that had been previously barbed or threaded—for instance, the nail-stock patented to me May 26, 1885, No. 318,564—but for the purpose of producing solid heads and also for leaving any desired length of plain body *e* under the head, I prefer to use all four steps of my process. The first three steps are the same whether the rod or wire is plain or barbed.

I am aware of the patent to Rogers, No. 264,479, dated September 19, 1882, for a screw-nail having threaded or serrated longitudinal sections and intermediate longitudinal grooves in which the method of making said nail is described in the following language: "Having selected a rod of this character of suitable size and form for the intended screw-nail, I cut upon the longitudinal convex sections *a a* a screw-thread, as shown, and afterward form the head *c* on the rod in a heading-machine, such as is employed for heading screw-blanks, and also form the end into a driving-point by the usual machinery for such purpose. The nick in the head, or other device for enabling the screw-nail to be turned axially, is also made by the usual machinery employed. If preferred, the rods, before they are threaded, may be headed, nicked, and pointed."

All that is shown or described in said prior art is hereby disclaimed.

My method differs from that of said Rogers patent in the fact that "cutting the nail from the rod or wire" is the step which immediately follows the act of "slotting the head," and these steps do not follow each other in the same order in the Rogers method; on the contrary, the Rogers patent mentions the use of a "heading-machine, such as is employed for heading screw-blanks," and such machines cut the blank from the rod or wire before the head is formed, and, consequently, before "slotting the head."

I claim as my invention—

1. That improvement in the art of forming screw-nails which consists in forming the head on the end of a rod or wire by upsetting, then slotting said head, and then cutting the nail from said rod or wire and pointing it, substantially as described, and for the purpose specified.

2. That improvement in the art of forming screw-nails which consists in forming the head on the end of a rod or wire by upsetting, then slotting said head, then cutting the nail from said rod or wire and pointing it, and then forming the screw or barb thereon, substantially as described, and for the purpose specified.

HORACE K. JONES.

Witnesses:
M. S. WIARD,
W. C. RUSSELL.